(12) United States Patent
Fonseka (10) Patent No.: US 9,098,673 B2
(45) Date of Patent: Aug. 4, 2015

(54) STRUCTURAL OPTIMIZATION FOR VEHICLE CRASHWORTHINESS

(75) Inventor: Sanjaya Fonseka, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 766 days.

(21) Appl. No.: 13/070,272

(22) Filed: Mar. 23, 2011

(65) Prior Publication Data

US 2011/0238401 A1     Sep. 29, 2011

Related U.S. Application Data

(60) Provisional application No. 61/316,715, filed on Mar. 23, 2010.

(51) Int. Cl.
| | |
|---|---|
| *G06G 7/48* | (2006.01) |
| *G06F 17/50* | (2006.01) |
| *B60J 7/00* | (2006.01) |

(52) U.S. Cl.
CPC ........ *G06F 17/5095* (2013.01); *G06F 2217/08* (2013.01)

(58) Field of Classification Search
CPC .................................................. G06F 17/5095
USPC .................................... 703/1, 6, 7, 8; 700/98
See application file for complete search history.

(56) References Cited

U.S. PATENT DOCUMENTS

| | | | |
|---|---|---|---|
| 4,826,238 A | 5/1989 | Misono et al. | |
| 4,935,877 A | 6/1990 | Koza | |
| 5,549,349 A | 8/1996 | Corporon et al. | |
| 5,729,463 A * | 3/1998 | Koenig et al. | .................. 700/98 |
| 5,748,943 A * | 5/1998 | Kaepp et al. | ...................... 703/1 |
| 2001/0038231 A1 | 11/2001 | Takemoto et al. | |
| 2004/0172224 A1 | 9/2004 | Sadagopan et al. | |
| 2005/0022152 A1 | 1/2005 | Turk et al. | |

OTHER PUBLICATIONS

FE-Simulation Based Optimization of an Adaptive Restraint System Considering Multiple Front-Crash Load Cases using LS-OPT, Hove et al., 2005, retreived from http://www.lsoptsupport.com/documents/papers/optimization/2005/fe-simulation-based-optimization-of-an-adaptive/view, 16 pages.*

H. K. Ibrahim, Design optimization of vehicle structures for crashworthiness improvement, PhD dissertation, Concordia University, 2009, Canada.*

Fabian Duddeck, Multidisciplinary optimization of car bodies, 2008, Struct Multidisc Optim, 35, DOI 10.1007/s00158-007-0130-6, pp. 375-389.*

(Continued)

*Primary Examiner* — Aniss Chad
*Assistant Examiner* — Juan Ochoa
(74) *Attorney, Agent, or Firm* — Fenwick & West LLP (57) ABSTRACT

Optimum gauges of components in a vehicle side structure that meet minimum roof crush test requirement and side impact crashworthiness analysis (SICE) requirements with minimal mass are identified using a global optimization algorithm. A grouping of iterations, wherein each iteration contains input components of varying thicknesses, is simulated using the roof crush and SICE models. A self adaptive evolution optimization algorithm is used to generate additional groupings of iterations based on intermediate optimum results of a previous grouping. The additional groupings are simulated one or more times to identify a global optimum thickness of components in a vehicle side structure.

18 Claims, 5 Drawing Sheets

(56) References Cited

OTHER PUBLICATIONS

Jörgen Hilmann, On the development of a process chain for structural optimization in vehicle passive safety, 2009, Diss. PhD thesis, Technische Universität Berlin, Berlin, pp. 1-154.*

Uwe Schramm, Harold Thomas, and Detlef Schneider, "Structural optimization in occupant safety and crash analysis", 1998, Design Optimization 1.4, pp. 374-387.*

Uwe Schramm and Harold Thomas "Crashworthiness design using structural optimization", 1998, AIAA paper 98/4729, pp. 197-205.*

Back, T. "Evolutionary Computation: An Overview of Evolutionary Algorithms for Parameter Optimization," *Evolutionary Computation*, 1993, pp. 1-23, vol. 1, No. 1.

Fonseka, S. et al., "Development of a DOE/Optimization CAE Method to Simultaneously Improve Side Impact Occupant Restraint System Performance for Multiple Test Modes," *20th ESV Conference Proceedings*, 2007, eight pages.

Forsberg, J. et al., "Evaluation of Response Surface Methodologies Used in Crashworthiness Optimization," *International Journal of Impact Engineering*, May 2006, pp. 759-777, vol. 32, Issue 5.

Livermore Software Technnology Corp., "LS-DYNA Keyword User's Manual," Version 971 Sep. 2006, pp. 23-74, 177-238, 601-732, 751-810, and 1846-1859.

Noesis Solutions, "Optimus Rev 10 puts design engineers in the driver's seat for faster, better-targeted design optimization," Mar. 29, 2011, two pages. [Online] [Retrieved Dec. 19, 2011] Retrieved from the Internet <URL:http://www.noesissolutions.com/Noesis/about/news/press-releases/optimus-rev-10-available.>.

Noesis Solutions, "Optimus: Automotive," two pages. [Online] [Retrieved Dec. 28, 2011] Retrieved from the Internet <URL: http://www.noesissolutions.com/Noesis/industry/automotive.>.

Noesis Solutions, "Optimus: Multi-Objective Optimization," two pages. [Online] [Retrieved Dec. 19, 2011] Retrieved from the Internet <URL:http://www.noesissolutions.com/Noesis/design-optimization/optimize/multi-objective-optimization.>.

Noesis Solutions, "Optimus: Design Optimization," two pages. [Online] [Retrieved Dec. 19, 2011] Retrieved from the Internet <URL:http://www.noesissolutions.com/Noesis/design-optimization.>.

Schwefel, H.P., "Numerical Optimization of Computer Models," 1981, pp. 9-17, 104-111, John Wiley & Son, Chicester, New York.

* cited by examiner

STRUCTURAL OPTIMIZATION FOR VEHICLE CRASHWORTHINESS

CROSS REFERENCE TO RELATED APPLICATIONS

This application claims the benefit of U.S. Provisional Application No. 61/316,715, filed Mar. 23, 2010 which is incorporated by reference in its entirety.

FIELD OF THE INVENTION

The present invention relates to the field of optimization, and more specifically, to optimizing vehicle parts to meet crash test requirements.

BACKGROUND

Government and insurance institutions have introduced many safety standards that auto manufacturers should comply with to reduce the risk of serious and fatal injury to occupants during side impact crashes. To achieve a desired crash-worthiness the auto industry focuses on developing better vehicle side body structures to meet the standards for multiple side impact crash tests, such as Insurance Institute for Highway Safety's (IIHS) Side Impact Crashworthiness Evaluation (SICE) and FMVSS 216 (roof-crush) vehicle safety tests.

Engineers design side structures to meet several design goals, including efficiency, weight loss and cost as well as to meet vehicle safety test requirements. To find an optimum thickness for vehicle side body components that meet varying design goals, design engineers typically simulate vehicle safety tests with components of varying thicknesses. Thus, one can find an optimum thickness of a component for a vehicle safety test by individually adjusting the thickness for each component. However, an optimum thickness of a component for one vehicle safety test may be different for other vehicle safety tests. Therefore, design engineers may have to guess an optimum thickness for components that meet two or more vehicle safety tests. Thus, traditional approaches to design and tune vehicle side structures by considering each vehicle test separately is inefficient and requires significant design time and experience. Still, the engineer may not find the optimum structure with respect to weight and strength.

SUMMARY

Embodiments of the present invention provide a method (and corresponding system and computer program product) for finding optimum thickness values of components in a vehicle's side structure. A first grouping of iterations is received, wherein each iteration comprises a thickness values for each component in the side structure. Each iteration is the first grouping is simulated using a roof crush test mode and a side impact crashworthiness evaluation test mode. The results of the simulations are received, wherein at least one intermediate optimum is identified. Furthermore, additional groupings of iterations are generated, wherein each additional grouping is based on intermediate optimum results of a previous grouping. Each iteration in each additional groupings is simulated using the roof crush and side impact crashworthiness evaluation test mode and an optimized result is identified.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 5 illustrates a table of simulated gauges for two vehicle crash tests in accordance with one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which are set forth in the claims.

System Architecture

Figure 1:
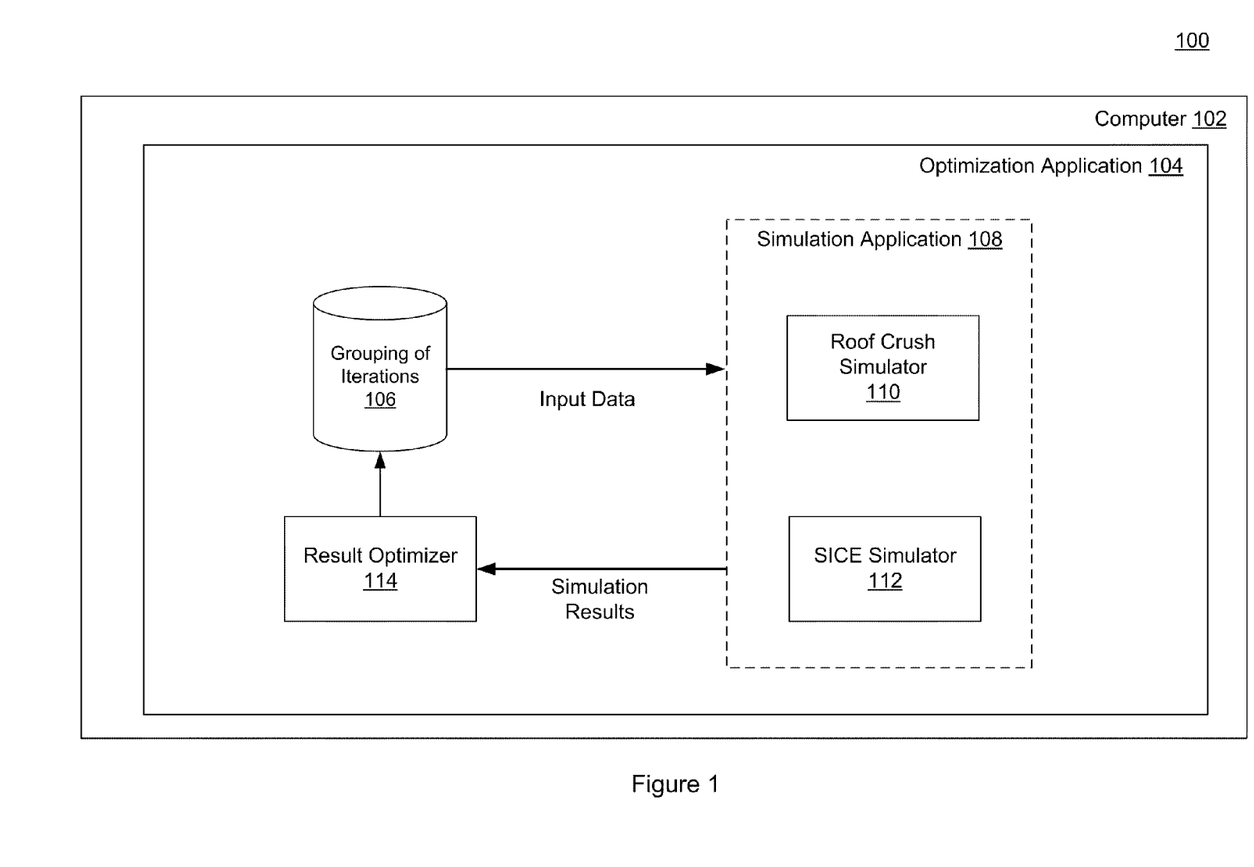
FIG. 1 is a high-level block diagram of a computing environment according to one embodiment of the present invention.

FIG. 1 an illustration of a computer to execute an optimization application in accordance with one embodiment. The computer 102 includes an optimization application 104, a grouping of iterations 106, a simulation application 108, a roof crush simulator 110, a side impact crashworthiness evaluation (SICE) simulator 112 and a result optimizer 114.

In one embodiment, the computer 102 is an electronic device used by a user to perform computing tasks such as executing one or more applications including a crash test simulation application 108. The computer 102 may comprise any computing system with a processor and a memory. For example, the computer 102 may be a desktop computer, one or more desktop computers connected over a network or one or more servers connected together. A computer 102 is described in greater detail in reference to FIG. 2.

The optimization application 104 is a program executing on the computer 102. In one embodiment, the optimization application 104 finds optimum thicknesses of components in a vehicle side structure such that the side structure has minimal weight to meet or exceed minimum crash test requirements. The optimum thickness of a component as discussed herein includes any thickness value of components that achieves the objectives of low weight and vehicle crash test requirements. Optimum thickness, as discussed herein need not include the lowest possible thickness value that meets the requirements of the SICE and roof crush crash tests but one that is optimized using an optimization application or algorithm, such as the algorithm described herein. In one embodiment, the optimization application 104 retrieves a data store of a grouping of one or more iterations 106. An iteration comprises one or more components in a vehicle side structure, wherein each component has a predefined simulated thickness. Components in a vehicle side structure include roof cross members, B-pillars, center reinforcement and side sill structural members. In one embodiment, the optimization application 104 retrieves the grouping if iterations 106 and provides it as an input to the simulation application 108.

The simulation application 108 receives one or more input iterations 106 within a grouping and simulates the performance of the one or more iterations in two or more vehicle safety tests. In one embodiment, the simulation application 108 includes a roof crush vehicle safety test simulator 110 and a SICE vehicle safety test simulator 112. In other embodiments, the simulation application 108 may include other vehicle safety test simulators.

In an embodiment, the roof crush simulator 110 simulates the IIHS FMVSS 216 (roof-crush) vehicle safety test. Similarly, the SICE simulator 112 simulates the IIHS Side Impact Crashworthiness Evaluations (SICE) vehicle safety test. In one embodiment, the roof crush simulator outputs a resultant force or a roof crush strength as a result of the roof crush simulation. Similarly, the SICE simulator outputs a resultant survival space or distance from the center of the vehicle to a B-Pillar that is deformed as a result of the SICE simulation.

In one embodiment, the optimization application 104 interfaces with the simulation application 108 to provide the results of the simulations to the result optimizer 114. The result optimizer selects intermediate optimums by identifying input iterations with the lowest mass in the grouping 106 that also met the minimum roof crush strength requirement and the minimum survival space requirement. Additionally, the result optimizer 114 generates a new grouping of iterations 106 based on the intermediate optimums. In one embodiment, the result optimizer uses an optimization algorithm such as self-adaptive evolution to generate a next grouping of iterations 106 and the intermediate optimums.

The grouping of iterations 106 generated by the result optimizer 114 is simulated by the simulation application 108 as described above. The process can continue through several, pre-selected number of cycles. Thus, the optimization application 104 can find a optimum thickness of components in a vehicle side structure by executing two or more cycles of simulations and optimizations.

Figure 2:
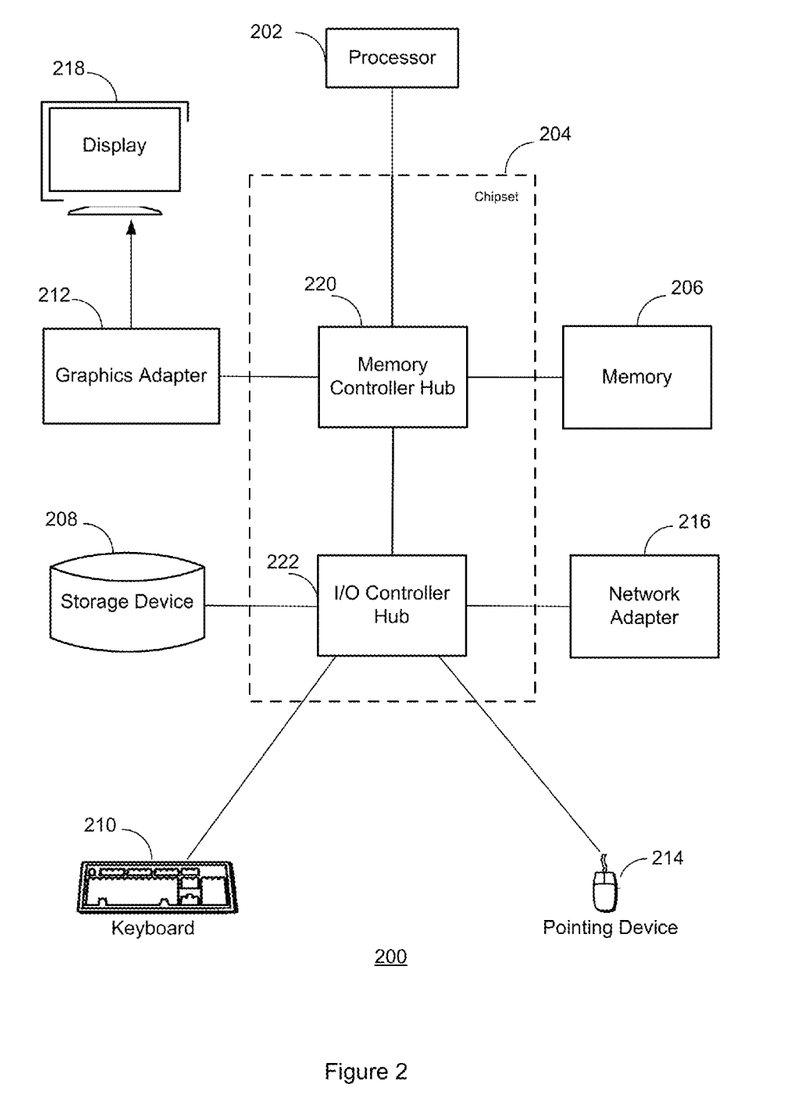
FIG. 2 is a high-level block diagram illustrating a functional view of a typical computer system for use as an entity illustrated in the environment of FIG. 1 according to an embodiment of the present invention.

FIG. 2 is a high-level block diagram illustrating a functional view of a typical computer system for use as an entity illustrated in the environment of FIG. 1 according to an embodiment of the present invention. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display device 218. The network adapter 216 couples the computer 200 to a network. Some embodiments of the computer 200 have different and/or other components than those shown in FIG. 2. The types of computer 200 can vary depending upon the embodiment and the desired processing power. The computer 200 may comprise multiple blade servers working together to provide the functionality described herein.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The above description is included to illustrate the operation of the embodiments and is not meant to limit the scope of the invention. From the above discussion and attached appendices, many variations will be apparent to one skilled in the relevant art that would yet be encompassed by the spirit and scope of the invention.

Figure 3:
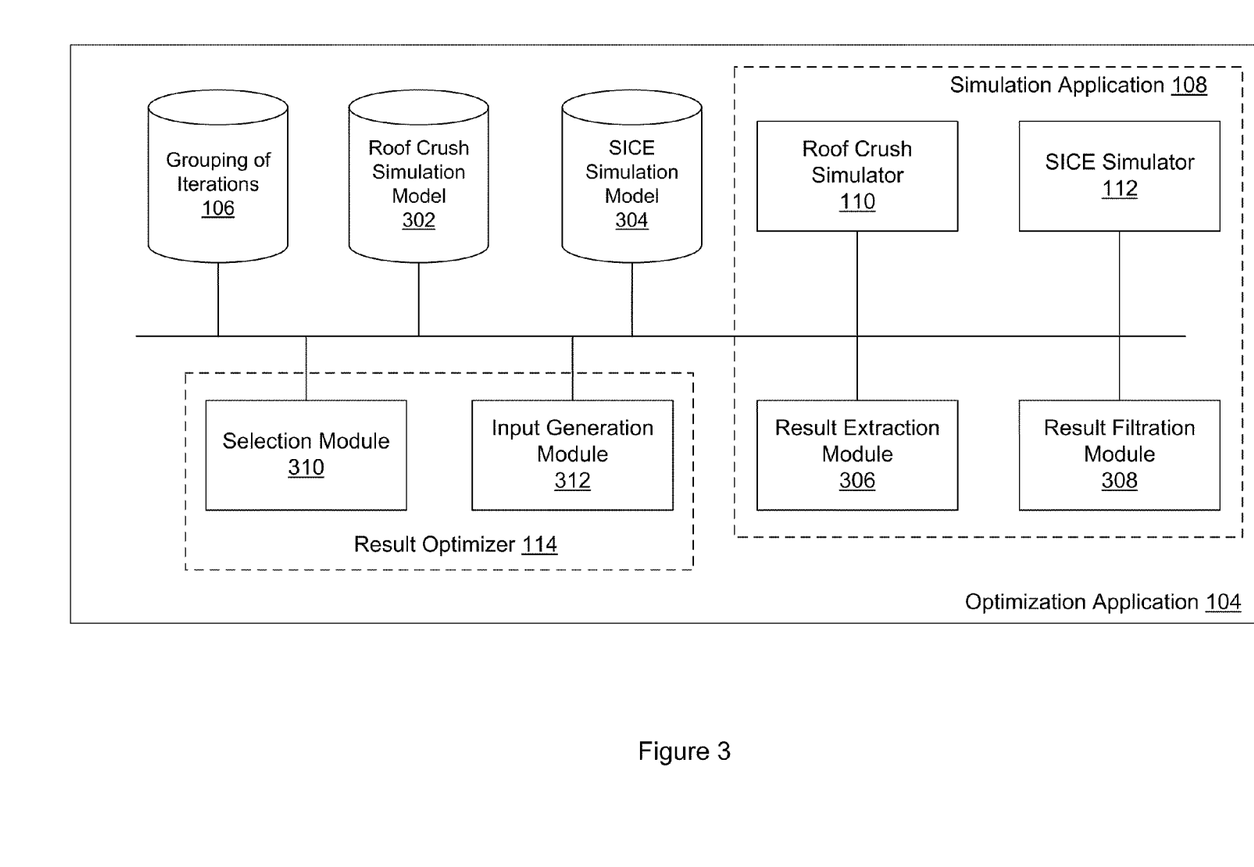
FIG. 3 is a high-level block diagram illustrating modules within an optimization application according to one embodiment.

FIG. 3 is a high-level block diagram illustrating modules within an optimization application according to one embodiment. Those of skill in the art will recognize that other embodiments can have different and/or other modules than the ones described here, and that the functionalities can be distributed among the modules in a different manner.

As shown in FIG. 3, the optimization application 104 includes a grouping of iterations 106, a roof crush simulation model 302, a SICE simulation model 304, a simulation application 108 comprising a roof crush simulator 110, a SICE simulator 112 a result extraction module 306 and a result filtration module 308, a result optimizer 114 comprising an selection module 310 and an input generation module 312.

In one embodiment, the grouping of iterations 106 includes one or more iterations, wherein each iteration comprises values representing characteristics of one or more components in a vehicle's side structure. A component may include one or more of a roof cross members, B-Pillar, center reinforcements and sill structural members. In other embodiments, different and/or other components of a vehicle side structure can be used. The thickness of each component in an iteration can be pre-defined or the thickness values can be selected by the optimization application 104. In one embodiment, the thickness of each component in an iteration is randomly selected within pre-defined thickness parameters or ranges. For example, thickness values outside of a certain parameter may not be feasible to engineer or may cause the vehicle side structure to become unbalanced. In other embodiments, the input values for each component may include a weight of the component. The thickness of the component can be calculated based upon the weight of the material used to make the component. Similarly, if a thickness value is used as an input, the weight can be determined based upon the weight of the material used to make the component.

The roof crush simulation model 302 and the SICE simulation model 304 provide simulation data to be applied to one or more iteration of input parts. In one embodiment, the simulation models may be an executable file and can provide input data in a variety of formats.

The simulation application 108 simulates vehicle crash tests for each one or more iterations of input within the grouping of iterations 106. In one embodiment, the simulation application 108 is a part of the optimization application 104. In another embodiment, the simulation application 108 executes on the computer 102 and interfaces with the optimization application 104 to output simulation results for each iteration of input parts. The simulation application 108 can simulate other crash test modes other than roof crush and SICE crash tests discussed herein.

The roof crush simulator 110 simulates the IIHS FMVSS 216 (roof-crush) vehicle safety test for each iteration of input parts in a grouping of iterations 106. In one embodiment, the roof crush simulator 110 outputs a roof crush strength or resultant force sustained by the side structure as a result of the roof crush crash test simulation. In another embodiment, the roof crush simulator 110 outputs force values sustained by the vehicle side structure along one or more dimensions.

The SICE simulator 112 simulates the IIHS Side Impact Crashworthiness Evaluation (SICE) vehicle safety test for each iteration within the grouping of iterations 106. In one embodiment, the SICE simulator 112 outputs an intrusion distance of a B-Pillar as a result of its deformation in the simulation. An intrusion distance of the B-Pillar towards the driver's seat can be used to calculate survival space which is measured as the distance from the center of the vehicle to an inner B-Pillar. In another embodiment, the SICE simulator 112 also measures the mass of vehicle side structure components within an iteration and outputs a total mass of components. However, the optimization application 104 or the roof crush simulator 110 can also measure the total mass of the components based on each component's individual thickness values.

The result filtration module 308 filters simulations that did not complete correctly in the roof-crush 110 or SICE 112 simulators. For example, for certain thickness values of components in a side structure can cause simulation errors because those thickness values cause the side structure to become severely unbalanced and cause numerical instability in the simulation results. In instances wherein input thickness value in an iteration cause errors in one simulator and not the other, the filtration module filters the iteration in both simulators. In one embodiment, the filtration module 308 flags the iterations that had errors in either the roof-crush simulator 110 or the SICE simulator 112.

The result extraction module 306 extracts the results of the simulations performed by the roof-crush simulator 110 and the SICE simulator 112. In one embodiment, the simulators perform the simulation and output results of the simulations on a table. The result extraction module 306 extracts certain values from the table to identify, for example, the resultant force or intrusion length of the vehicle side structure. In one embodiment, the result extraction module 306 computes a resultant force of the vehicle side structure based on forces along one or more dimensions calculated by the roof-crush simulator 110. Similarly, the result extraction module 306 can calculate a survival space length based on intrusion length measured by the SICE simulator 112. The survival space length is the distance from the center of the vehicle to an inner B-Pillar. In one embodiment, the result extraction module 306 computes a total mass of the iteration of components based on the mass of each component within the iteration. The result extraction module 306 provides the results of the simulation and the total mass of the side structure to the result optimizer 114.

The result optimizer 114 finds the optimum thickness of vehicle side structure for the roof-crush crash test and the SICE crash test based on the crash response results provided by the simulation application 108. In one embodiment, the result optimizer 114 includes a selection module 310 and an input generation module 312. The optimum thickness and/or result refers to a thickness result that satisfies the criteria such as the lowest weight using an optimization algorithm such as that described herein.

The selection module 310 identifies one or more intermediate optimum results within the results provided by the simulation application 108. In one embodiment, wherein the optimization goal is to minimize total mass and meet the performance standards of both, roof-crush safety test and SICE safety test, the selection module 310 identifies one or more iterations that meet the safety test requirements and have the lowest mass. The one or more identified iterations are labeled as intermediate optimums. In an embodiment wherein the filtration module 308 flags iterations that did not perform correctly, the selection module 310 disregards the flagged iterations when selecting an optimum iteration.

The input generation module 312 generates one or more new iterations based on the intermediate optimums selected by the selection module 310. In one embodiment, the input generation module 312 uses a global optimization method called Self Adaptive Evolution (SAE) to drive the optimization. An example of Self adaptive evolution is discussed in "Evolutionary Computation: An Overview of Evolutionary Algorithms for Parameter Optimization," by Thomas Back; (Evolutionary Computation, Spring 1993, Vol. 1, pages 1-23; Dec. 10, 2007) which is incorporated by reference herein. The SAE strategy is a multi-recombinant scheme based on a population of designs; its strategy is to imitate biological mutation and selection when generating new iterations based on previous ones. The input generation module 312 receives the intermediate optimums and mutates the iterations to generate one or more new iterations. Thus, in one embodiment, a new grouping of iterations is generated based on the intermediate optimums. In some embodiments, the input generation module 312 selects new thickness values of components in an iteration based on a convergence criterion and a maximum and a minimum thickness range parameter for each component.

In one embodiment, the new grouping of iterations generated by the input generation module 312 is stored in the grouping of iterations 106 data store. The new grouping of iterations is used by the simulation application 108 as described in the specification. The simulation and optimization process continues for a predetermined number of cycles or when a global optimum is reached.

Operation and Use

Figure 4:
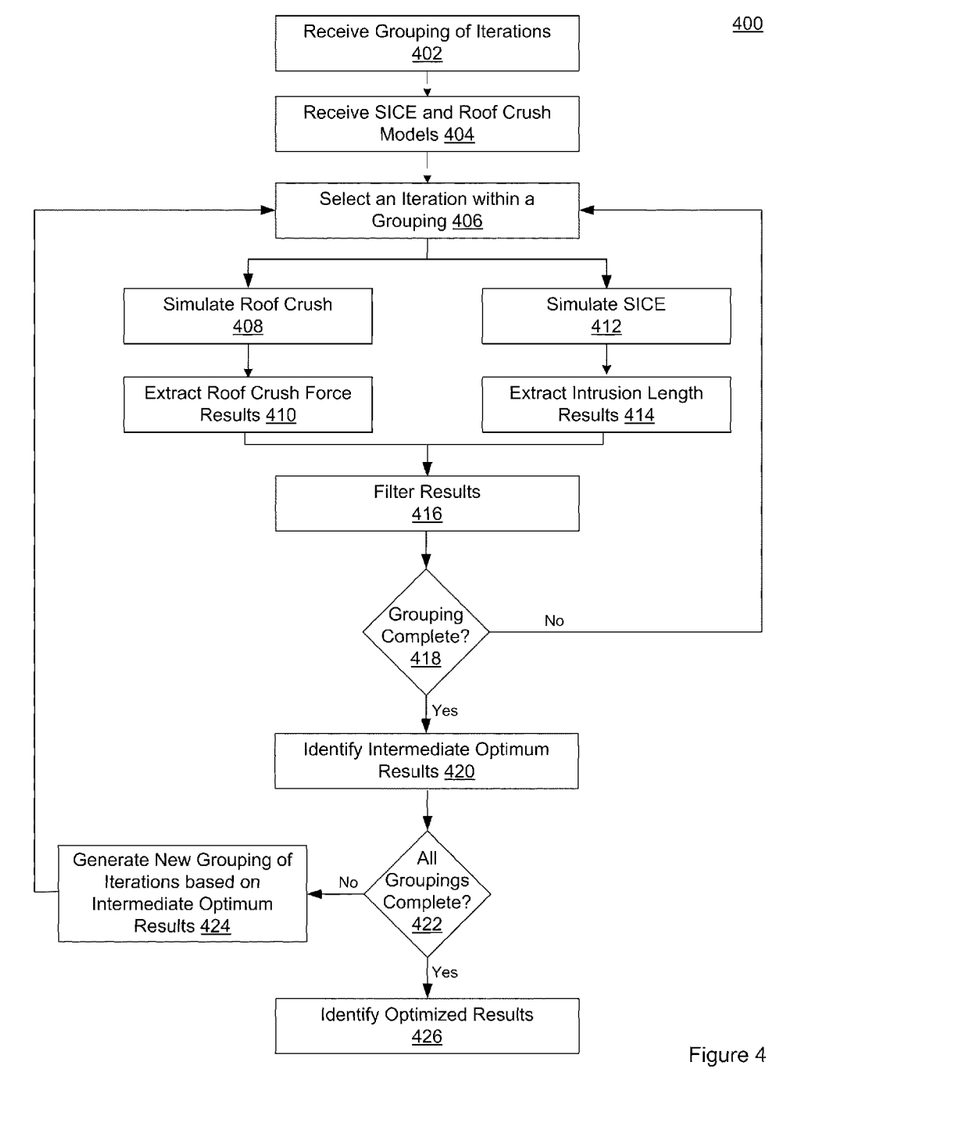
FIG. 4 is a flowchart of a method of identifying optimum gauges of vehicle components in accordance with one embodiment of the in-vehicle system.

FIG. 4 is a flowchart of a method of identifying optimum gauges of vehicle components in accordance with one embodiment of the in-vehicle system. In one embodiment, the process 400 begins by receiving 402 a grouping of iterations wherein each iteration values of one or more characteristics e.g., the thickness of multiple components are used as inputs to the SICE and roof-crush models. Examples of a side structure's components include but are not limited to roof cross members, B-pillars, center reinforcement, and sill structural members. Each component's input thickness value can be provided by a user or it can be randomly selected such that the thickness values fall within a nominal thickness range. For example, thickness values outside of a certain range may not be feasible to make/use or may cause the vehicle side structure to become unbalanced. In an instance where weight values of components are used as inputs, the thickness values for each component can be computed based upon the input weight of the material used to make the component. Similarly, wherein thickness values are used as inputs, the weight of each component can be determined based upon the input thickness and the type of material used to make the component.

The process 400 receives a SICE and roof-crush simulation models. The simulation models can comprise data describing how components may react to forces applied in a crash test. The models can be in an executable file format in one embodiment of the invention. In one embodiment, the process 400 selects 406 an iteration within a grouping; that is the process receives the input values requesting one or more characteristics of the multiple components. For example, an iteration within the grouping received 402 by the process 400 can be selected for simulation. In another embodiment, all the iterations within the grouping are selected simultaneously for simulation.

For each iteration selected 406 within a grouping, the process 400 identifies the input values of the corresponding characteristics and simulates 408 the roof-crush safety crash test. The simulation 408 is performed by using the thickness values, for example of side structure components as inputs to the received 404 roof-crush safety test model. The results of the simulation are extracted 410 once the simulation is completed or an error in the simulation is detected. In one embodiment, the result of the simulation includes the resultant force experienced by the vehicle side structure as a result of the roof-crush simulation.

Similarly, SICE simulation is applied 412 to each iteration selected from a grouping. The SICE simulation 412 is performed by using the thickness values of side structure components as input and applied to the SICE model received 404 by the process 400. The results of the simulation are extracted 414 once the simulation is complete or an error is detected in the simulation. The results of the SICE simulations include the intrusion length caused by deformation of a side structure component in response to the crash test simulation.

In one embodiment, the simulation results are filtered 416 for both the roof-crush crash test simulation and the SICE crash test simulation if an error is detected for either simulation. For example, if an iteration fails to simulate correctly for either the roof-crush simulation or the SICE simulation, the iteration is filtered 416 such that the thickness values of the iteration are not selected as an intermediate optimum. In other embodiments, the iterations with errors are filtered 416 by flagging the results as such. If no errors are detected in the simulation of both roof-crush and SICE crash tests then the results are not filtered. In an embodiment, the SICE and roof-crush simulations can be stopped before completion of the iteration if an error occurs in either of these simulations.

In one embodiment, the process 400 determines 418 if all the iterations within the received 402 grouping have undergone a roof-crush simulation 408 and a SICE simulation 412. If all the iterations within a grouping have not completed, the process selects 406 another iteration within the grouping. Thus, the process continues as described herein until all the iterations in the group have undergone the two crash test simulations.

If all the iterations within the grouping are complete 418, the process 400 identifies 420 one or more intermediate optimum results. An intermediate optimum is a simulation result that has the lowest mass and meets a minimum force requirement of the roof-crush crash test and a minimum survival space requirement of the SICE crash test.

The process continues by determining if all groupings are complete 422. A number of groupings can be pre-set by the process 400. For example, if the total number of groupings is set at eight, the process 400 can perform eight sets of optimizations. Thus, if the process 400 determines that all the groupings in a pre-set number of groupings have not been through a simulation, the process generates 424 a new grouping of iterations based on the intermediate optimum results of the previous grouping. A new grouping may comprise one or more iterations. The new grouping is generated using a global optimization method. For example a Self Adaptive Evolution (SAE) strategy is used to generate one or more new iterations in a grouping by imitating biological mutation. For example, the intermediate optimum results identified 420 from the previous grouping represent the best fit from the previous generation. A multi-recombinant method is used to mutate the best fit results and generate new iterations for a new grouping. As described in reference to FIG. 3 the new iterations can be generated based on a convergence criteria and within certain thickness parameters.

Once a new grouping is generated 424, the process 400 continues by selecting an iteration within the grouping as described above. Once all groupings are completed 422, the process 400 identifies 426 optimized results. An example of the optimized results is shown in FIG. 5.

FIG. 5 displays simulation results for the first twenty two simulations. Of the twenty two simulations shown in FIG. 5, the first fifteen simulations are part of a first grouping. The first five columns represent five different components of the vehicle side structure. The values in the 'Max_Force_RootC' column represent the resultant force on the side structure caused by the roof-crush simulation. The values in the 'Minimum_length' column represent the distance from the center of the vehicle to a deformed B-Pillar after the SICE simulation. The values in the 'Mass' column represent the total mass of the components in columns one through five. As can be seen from FIG. 5, the result optimizer 114 finds more optimum input values of components in columns one through five from the first grouping to the next by allocating lesser mass to structural components.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A computer based method for finding optimum thickness of components in a vehicle side structure, the method comprising:

receiving a first grouping of simulation variables, wherein each simulation variable comprises at least two thickness values, each thickness value is associated with a component in the vehicle side structure;

simulating a roof crush crash test for the first grouping of simulation variables;

simulating a side impact crashworthiness evaluation crash test for the first grouping of simulation variables;

receiving results of the roof crush crash test simulation and the side impact crashworthiness evaluation crash test simulation on the first grouping of simulation variables;

identifying one or more results from the received results, the one or more results meeting a minimum required result for both the roof crush crash test simulation and the side impact crashworthiness evaluation crash test simulation;

identifying an intermediate optimum result from the one or more results, the intermediate optimum result corresponding to a simulation variable with a least amount of total mass in the components of the vehicle side structure from one or more simulation variables corresponding to the one or more results meeting the minimum required result for both the roof crush crash test simulation and the side impact crashworthiness evaluation crash test simulation;

generating a second grouping of simulation variables by modifying thickness values in at least one simulation variable of said first grouping of simulation variables based on the intermediate optimum result;

simulating the roof crush crash test and the side impact crashworthiness evaluation crash test for the second grouping of simulation variables; and identifying the optimum thickness of the components in the vehicle side structure, based in part of results of the roof crush crash test simulation and the side impact crashworthiness evaluation crash test simulation on the second grouping of simulation variables.

2. The method of claim 1, wherein the simulation variable comprises thickness values of at least one of a roof cross member, B-Pillar, center reinforcement and sill structure members.

3. The method of claim 1, wherein the thickness values are randomly selected from a design space subject to minimum and maximum parameters.

4. The method of claim 1, further comprising:

extracting roof crush crash test results from the roof crush crash test simulation; and extracting side impact crashworthiness evaluation crash test results from the side impact crashworthiness evaluation crash test simulation.

5. The method of claim 1, further comprising filtering simulation results of a simulation variable failing at least one of the roof crush crash test simulation and the side impact crashworthiness evaluation crash test simulation.

6. The method of claim 1, wherein a result of the roof crush crash test simulation is a resultant force measuring roof crush strength and a result of the side impact crashworthiness evaluation crash test simulation is survival space measuring a deformation of a B-pillar.

7. The method of claim 1, wherein the second grouping of simulation variables are generated using a self adaptive evolution algorithm.

8. The method of claim 1, wherein for generating the second grouping of simulation variables, the thickness values in at least one simulation variable of said first grouping of simulation variables are modified using a convergence criteria.

9. A system for finding optimum thickness of components in a vehicle side structure, the system comprising:
- a computer processor for executing executable computer program code; and
- a computer-readable storage medium containing the executable computer program code for performing a method comprising:
  - receiving a first grouping of simulation variables, wherein each simulation variable comprises at least two thickness values, each thickness value is associated with a component in the vehicle side structure;
  - simulating a roof crush crash test for the first grouping of simulation variables;
  - simulating a side impact crashworthiness evaluation crash test for the first grouping of simulation variables;
  - receiving results of the roof crush crash test simulation and the side impact crashworthiness evaluation crash test simulation on the first grouping of simulation variables;
  - identifying one or more results from the received results, the one or more results meeting a minimum required result for both the roof crush crash test simulation and the side impact crashworthiness evaluation crash test simulation;
  - identifying an intermediate optimum result from the one or more results, the intermediate optimum result corresponding to a simulation variable with a least amount of total mass in the components of the vehicle side structure from one or more simulation variables corresponding to the one or more results meeting the minimum required result for both the roof crush crash test simulation and the side impact crashworthiness evaluation crash test simulation;
  - generating a second grouping of simulation variables by modifying thickness values in at least one simulation variable of said first grouping of simulation variables based on the intermediate optimum result;
  - simulating the roof crush crash test and the side impact crashworthiness evaluation crash test for the second grouping of simulation variables; and
  - identifying the optimum thickness of the components in the vehicle side structure, based in part of results of the roof crush crash test simulation and the side impact crashworthiness evaluation crash test simulation on the second grouping of simulation variables.

10. The system of claim 9, wherein the simulation variable from one of the first grouping of simulation variables and the second grouping of simulation variables comprises thickness values of at least one of a roof cross member, B-Pillar, center reinforcement and sill structure members.

11. The system of claim 9, wherein the thickness values are randomly selected from a design space subject to minimum and maximum parameters.

12. The system of claim 9, wherein the computer-readable storage medium containing the executable computer program code for performing the method further comprises:
- extracting roof crush crash test results from the roof crush crash test simulation; and
- extracting side impact crashworthiness evaluation crash test results from the side impact crashworthiness evaluation crash test simulation.

13. The system of claim 9, wherein the computer-readable storage medium containing the executable computer program code for performing the method further comprises filtering simulation results of a simulation variable failing at least one of the roof crush crash test simulation and the side impact crashworthiness evaluation crash test simulation.

14. The system of claim 9, wherein a result of the roof crush crash test simulation is a resultant force measuring roof crush strength and a result of the side impact crashworthiness evaluation crash test simulation is survival space measuring a deformation of a B-pillar.

15. The system of claim 9, wherein the second grouping of simulation variables are generated using a self adaptive evolution algorithm.

16. The system of claim 9, wherein for generating the second grouping of simulation variables,
- the thickness values in at least one simulation variable of said first grouping of simulation variables are modified using a convergence criteria.

17. A computer program product for finding optimum thickness of components in a vehicle side structure, the computer program product comprising a non-transitory computer-readable storage medium containing computer program code for:
- receiving a first grouping of simulation variables, wherein each simulation variable comprises at least two thickness values, each thickness value is associated with a component in the vehicle side structure;
- simulating a roof crush crash test for the first grouping of simulation variables;
- simulating a side impact crashworthiness evaluation crash test for the first grouping of simulation variables;
- receiving results of the roof crush crash test simulation and the side impact crashworthiness evaluation crash test simulation on the first grouping of simulation variables;
- identifying one or more results from the received results, the one or more results meeting a minimum required result for both the roof crush crash test simulation and the side impact crashworthiness evaluation crash test simulation;
- identifying an intermediate optimum result from the one or more results, the intermediate optimum result corresponding to a simulation variable with a least amount of total mass in the components of the vehicle side structure from one or more simulation variables corresponding to the one or more results meeting the minimum required result for both the roof crush crash test simulation and the side impact crashworthiness evaluation crash test simulation;
- generating a second grouping of simulation variables by modifying thickness values in at least one simulation variable of said first grouping of simulation variables based on the intermediate optimum result;
- simulating the roof crush crash test and the side impact crashworthiness evaluation crash test for the second grouping of simulation variables; and
- identifying the optimum thickness of the components in the vehicle side structure, based in part of results of the roof crush crash test simulation and the side impact crashworthiness evaluation crash test simulation on the second grouping of simulation variables.

18. The computer program product of claim 17, wherein the second grouping of simulation variables are generated using a self adaptive evolution algorithm.

* * * * *